US012081319B2

(12) United States Patent
Ferrari et al.

(10) Patent No.: US 12,081,319 B2
(45) Date of Patent: Sep. 3, 2024

(54) OPTICAL TRANSMITTER

(71) Applicants: Cambridge Enterprise Limited, Cambridge (GB); Consorzio Nazionale Interuniversitario per le Telecomunicazioni (CNIT), Parma (IT)

(72) Inventors: Andrea C. Ferrari, Cambridge (GB); Marco Romagnoli, Milan (IT); Vito Sorianello, San Giuliano Terme (IT)

(73) Assignees: Cambridge Enterprise Limited (GB); Consorzio Nazionale Interuniversitario per le Telecomunicazione (IT)

(*) Notice: Subject to any disclaimer, the term of this patent is extended or adjusted under 35 U.S.C. 154(b) by 108 days.

(21) Appl. No.: 17/436,570

(22) PCT Filed: Feb. 27, 2020

(86) PCT No.: PCT/GB2020/050476
§ 371 (c)(1),
(2) Date: Sep. 3, 2021

(87) PCT Pub. No.: WO2020/178559
PCT Pub. Date: Sep. 10, 2020

(65) Prior Publication Data
US 2022/0149967 A1   May 12, 2022

(30) Foreign Application Priority Data
Mar. 6, 2019 (GB) .................................. 1902970

(51) Int. Cl.
*H04J 14/02* (2006.01)
*H04B 10/2513* (2013.01)
*H04B 10/548* (2013.01)

(52) U.S. Cl.
CPC ........ *H04J 14/02* (2013.01); *H04B 10/25137* (2013.01); *H04B 10/548* (2013.01)

(58) Field of Classification Search
CPC . H04J 14/02; H04B 10/25137; H04B 10/548; H04B 10/505; H04B 10/541;
(Continued)

(56) References Cited

U.S. PATENT DOCUMENTS 8,208,817 B2 *  6/2012  Doerr ................. H04B 10/505
                                                                398/186
2004/0021829 A1  2/2004  Griffin
(Continued)

FOREIGN PATENT DOCUMENTS

CN    102356570 A    2/2012
CN    103176294 A    6/2013
(Continued)

OTHER PUBLICATIONS

International Searching Authority, International Search Report and Written Opinion, mailed in relationship to International Application No. PCT/GB2020/050476, dated Jun. 4, 2020 (11 pages).
(Continued)

*Primary Examiner* — Hibret A Woldekidan
(74) *Attorney, Agent, or Firm* — Thomas Horstemeyer, LLP

(57) ABSTRACT

A Wavelength Division Multiplexing (WDM) for an optical fibre comprising a set of optical inputs, one for each wavelength of a WDM optical signal to be transmitted, a graphene electro-absorption modulator (EAM) for each optical input to modulate light from the optical input, and one or more drivers to drive each graphene electro-absorption modulator. The drivers have a data input, a low pass filter to low-pass filter data from the data input to provide low pass filtered data, and an output to drive each graphene electro-absorp-
(Continued)

tion modulator with a combination of the low pass filtered data and a bias voltage. The bias voltage is configured to bias the graphene EAM into a region in which, e.g., when the transmission of the graphene electro-absorption modulator increases the effective refractive index for the modulated light decreases and vice-versa to pre-chirp to the modulated light to compensate for dispersion in the fibre.

20 Claims, 13 Drawing Sheets

(58) Field of Classification Search
CPC ....... H04B 10/588; H04B 10/58; G02F 1/212; G02F 1/0157; G02F 1/025; G02F 1/225
See application file for complete search history.

(56) References Cited

U.S. PATENT DOCUMENTS

| | | | |
|---|---|---|---|
| 2004/0076199 A1* | 4/2004 | Wipiejewski | H01S 5/0265 372/26 |
| 2014/0056551 A1 | 2/2014 | Liu et al. | |
| 2014/0099114 A1* | 4/2014 | Nishihara | H04J 14/0298 398/67 |
| 2018/0107030 A1* | 4/2018 | Morton | H03H 7/38 |

FOREIGN PATENT DOCUMENTS

| | | | |
|---|---|---|---|
| CN | 105703209 | A | 6/2016 |
| EP | 1209828 | A2 | 5/2002 |
| EP | 1349302 | A2 | 3/2003 |
| JP | 09046318 | A | 2/1997 |
| JP | 2011159753 | | 7/2011 |
| WO | 2004/034530 | A1 | 4/2004 |

OTHER PUBLICATIONS

Intellectual Property Office, Search Report under Section 17(5), mailed in relationship to United Kingdom Application No. GB 1902970.1, dated Sep. 2, 2019 (5 pages).
Sorianello, V. et al., Chirp management in silicon-graphene electro absorption modulators, Optics Express, 25(16):19371-19381, Aug. 7, 2017 (12 pages).
Alessandri, C. et al., 4-Channel C-Band WDM Transmitter Based on 10 GHz Graphene-Silicon Electro-Absorption Modulators, 2019 Optical Fiber Communications Conference and Exhibition, Mar. 2019 (3 pages).
Romagnoli, M. et al., Graphene-based integrated photonics for next-generation datacom and telecom, Nature Reviews, 3: 392-414, Oct. 2018 (23 pages).
Alessandri, C. et al., 4-Channel C-Band WDM Transmitter Based on 10 GHz Graphene-Silicon Electro-Absorption Modulators, Optical Fiber Communications Conference and Exhibition, OFC 2019, OSA 2019 (3 pages).
Sorianello, V. et al., Chirp management in silicon-graphene electro absorption modulators, Optics Express, 25(16):19371-19381, 2017 (11 pages).
Romagnoli et al., Graphene-based intergrated photonics for next-generation datacom and telecom, Nature Reviews Material, 3:392-414, 2018 (40 pages).
English translation of CN Office Action dated Sep. 25, 2023 (CN Application No. 202080019087.0).
CN Office Action dated Sep. 25, 2023 (Application No. 202080019087.0).
JP Office Action dated Mar. 11, 2024, Application No. 2021-553053.

* cited by examiner

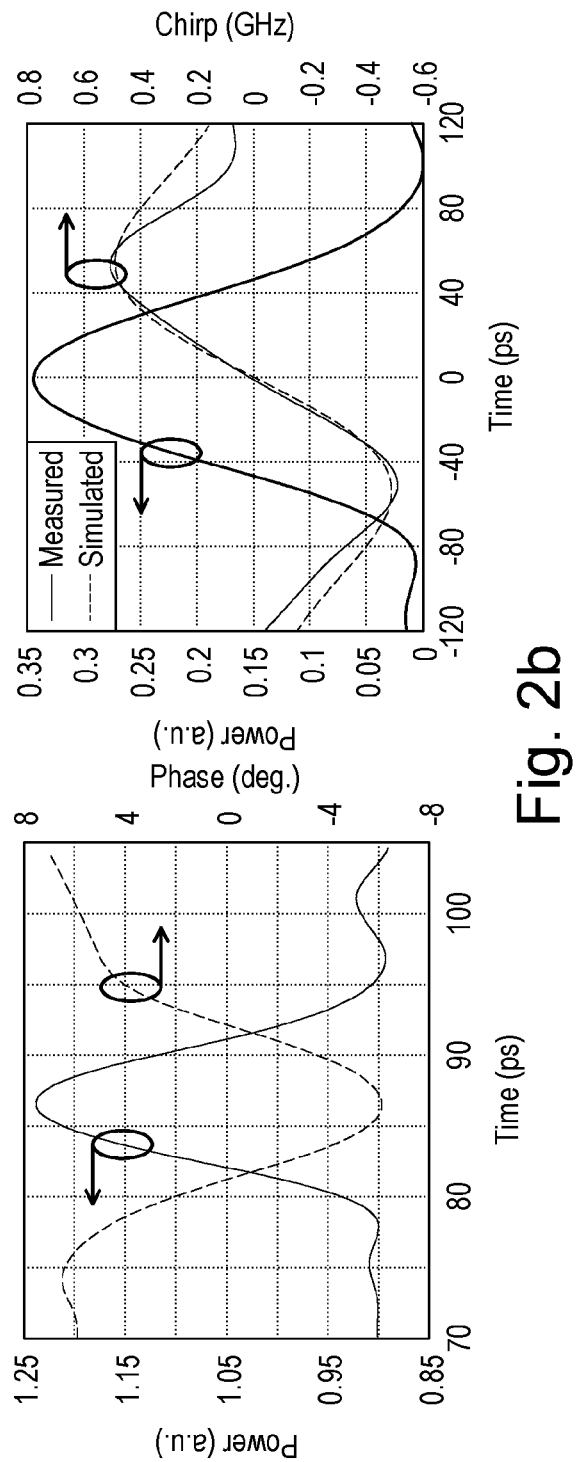
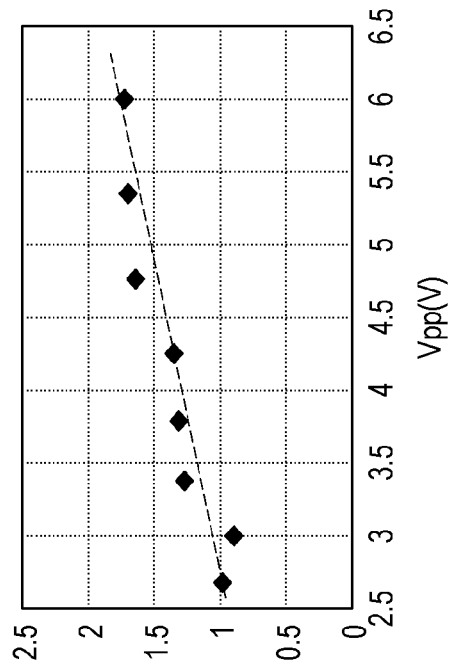
Fig. 2b
Fig. 2c

OPTICAL TRANSMITTER

FIELD

This invention relates to generally to optical transmitters, in examples for CWDM (Coarse Wavelength Division Multiplexing).

The project leading to this application has received funding from the European Union's Horizon 2020 research and innovation programme under grant agreement No 649953.

BACKGROUND

Coarse wavelength division multiplexing (CWDM) is a technique that permits the combination of multiple wavelength optical signals in one single mode fibre. In CWDM "coarse" refers to the wavelength separation between channels of 20 nm. Thus four wavelengths occupy 80 nm and eight wavelengths 160 nm. CWDM can be used to aggregate wavelengths carrying signals at 25 Gb/s each. Thus the combination of four wavelengths corresponds to a 100 Gb/s (4×25 Gb/s) optical link.

In practical systems each wavelength signal may be modulated according to the PAM4 format (4 levels of pulse amplitude to encode 2 bits), and per wavelength the data rate may then be 50 Gb/s. With, say, four wavelengths the effective data rate may therefore be 200 Gb/s (4×50 Gb/s).

The growth of bandwidth requirements makes transmission at 400 Gb/s, 800 Gb/s, and 1600 Gb/s desirable. The first step, to 400 Gb/s, can be realized with eight wavelength CWDM, CWDM8. The CWDM8 specifications are described in two documents (400G CWDM8 MSA 2 km and 400G CWDM8 MSA 10 km technical specifications) released by the CWDM8 multi source agreement consortium (https://www.cwdm8-msa.org/). One relevant aspect of the CWDM8 specification is the large spectral range covered by the eight wavelengths, 1271-1411 nm.

Background prior art can be found in Sorianello et al., "Chirp management in silicon-graphene electro absorption modulators", Optics Express, 15 (16) pages 19371-19381; CN103176294A; EP1209828A; EP1349302A; and WO2004/034530.

SUMMARY

In one aspect there is described a Wavelength Division Multiplexing (WDM) optical transmitter for transmitting a WDM signal along an optical fibre. The WDM optical transmitter may comprise a set of optical inputs (which may be internal to the transmitter), one for each wavelength of a WDM optical signal to be transmitted. The WDM optical transmitter may further comprise a graphene electro-absorption modulator (EAM) for each optical input to modulate light from the optical input. The WDM optical transmitter may further comprise one or more drivers to drive each graphene electro-absorption modulator; a driver may be shared between the EAMs or each EAM may have a respective driver. The or each driver may have a data input, a low pass filter to low-pass filter data from the data input to provide low pass filtered data (which here may include band pass filtered data), and an output to drive a graphene electro-absorption modulator. The modulated light from the optical inputs may be combined with an optical multiplexer to provide a combined, WDM multiplexed optical output.

The driver(s) are configured to drive the EAMs with a combination, for example sum, of the low pass filtered data, i.e. a varying voltage drive derived from the low pass filtered data, and a bias voltage. The bias voltage may be configured to bias the graphene electro-absorption modulator into a region in which when the transmission of the graphene electro-absorption modulator changes in a first direction the effective refractive index for the modulated light changes in a second, opposite direction and vice-versa.

In this way a chirp having a first sign is applied to the modulated light, which can compensate for chirp a second, opposite sign due to transmission of the modulated light through the optical fibre.

In some implementations the bias voltage is configured to bias the graphene of the graphene electro-absorption modulator into a region in which, when the transmission of the graphene electro-absorption modulator increases the effective refractive index for the modulated light passing through the graphene electro-absorption modulator decreases; and vice-versa. In this way a positive chirp is applied to the modulated light, which can compensate for negative chirp due to transmission of the modulated light through the optical fibre.

The modulation of the light typically comprises a form of pulse modulation, where data is encoded in pulses of light by any of a range of types of coding, for example NRZ (non-return to zero) coding. The modulation may comprise PAM (pulse amplitude modulation), for example PAM4 where 2 bits encode 4 amplitude levels.

A pulse travelling through the EAM acquires a positive chirp (instantaneous frequency increases with time), as described later. In some implementations the amount of chirp applied is controllable by controlling the peak-to-peak amplitude of the drive. Additionally or alternatively a bias voltage on the EAM may be controlled to control the amount of chirp applied. In implementations the optoelectronic properties of graphene can result in a large positive and approximately linear chirp. The positive pre-chirping of the signal compensates for the dispersion, for example the anomalous dispersion of the optical fibre, which typically but not necessarily comprises silica (see later). In effect pulses may be temporally focused at a distance at which the dispersion is compensated.

The pre-chirping also reduces inter-symbol interference (ISI). Low-pass filtering the data before applying this to the modulator synergistically helps to reduce ISI.

The wide bandwidth response of the graphene EAM facilitates multiplexing a wide range of wavelengths, for example for application in a CWDM8 or CWDM16 system.

In some implementations a graphene phase modulator is optically coupled in series with the graphene electro-absorption modulator in the signal path for one or more of the wavelengths. This can increase the amount of positive chirp and hence the length of fibre for which the dispersion is compensated.

To phase modulate the optical signal the bias voltage is chosen to bias the graphene of into a region in which it remains transparent with varying applied voltage. Here "remains substantially transparent" may be taken to mean that the transparency should not vary with the phase modulating drive voltage by more than 3 dB, preferably by not more than 1 dB. Preferably the bias voltage should bias the graphene phase modulator so that the portion of the modulator comprising the graphene should have a loss at the relevant wavelength of the optical signal of less than 3 dB, preferably less than 1 dB. A driver for the graphene phase modulator may be configured to drive the modulator with a combination of the bias voltage and a varying voltage drive derived from the low pass filtered data. The varying voltage drive derived from the low pass filtered data changes the effective refractive index of the graphene phase modulator for the modulated light, whilst the bias voltage maintains the modulator in a region where the transparency is substantially constant.

In some implementations a graphene phase modulator is optically coupled in series with the graphene electro-absorption modulator, counter-intuitively to add negative chirp to the modulated light. This can be achieved by biasing the graphene phase modulator as described above, but driving the phase modulator with a varying voltage drive comprising an inverted form of the low-pass filtered data. This may be derived, for example, by inverting and then low-pass filtering the inverted data, or by inverting the low pass filtered data for the EAM. It will be appreciated that the peak-to-peak level of this varying drive (for either configuration of phase modulator) will in general be different to that used for the EAM. By driving the graphene phase modulator using an inverted form of the data when the effective phase applied by the EAM is increasing that applied by the graphene phase modulator will be decreasing, and vice-versa. Thus the graphene phase modulator will apply an opposite chirp to that of the EAM. This can be used to compensate for an excessive positive chirp contribution applied by the EAM.

In some implementations the excessive positive chirp compensation is wavelength-dependent. The anomalous dispersion of the optical fibre is typically wavelength dependent and thus different pre-chirping may be applied to different wavelengths (i.e. wavelength bands) of the WDM signal. The amount of pre-chirping may be adjusted by adjusting the peak-to-peak (Vpp) drive voltage of the EAM and thus in some implementations a different Vpp may be applied to different ones of the wavelengths. Additionally or alternatively some of the wavelengths (bands) may have additional negative chirp applied. For example only selected ones of the optical inputs may be provided with a graphene phase modulator to apply negative chirp.

In some implementations a graphene phase modulator to apply negative chirp is applied to wavelengths below a threshold wavelength at which the anomalous dispersion (refractive index increases with wavelength) of the optical fibre changes to normal dispersion (refractive index decreases with wavelength). For CWDM16 a graphene phase modulator to apply negative chirp may be used for the wavelengths below ~1300 nm, e.g. 1291 nm, 1271 nm.

In some implementations the optical path from each optical input comprises an optical splitter to split the optical input into two or more branches, a graphene electro-absorption modulator for each branch to modulate light in the branch, and an optical combiner to combine the modulated light from the branches. This may be used to implement PAM4, PAM8 or higher modulation. Thus the one or more drivers may be configured to drive the graphene electro-absorption modulators in the branches with groups of two or more bits of data from the data input, for example MSB (most significant bit) and LSB (least significant bit) bits.

One or each of the branches may have a phase shifter (such as a 90 degree phase delay) or other device to rotate the polarization of one branch (or set of branches) with respect to the other. In this way light of the two branches may be given orthogonal linear or circular polarizations. This is advantageous as it can preserve the phase and chirp properties of each branch/polarization after their combination. The polarization rotation device i.e. the function of rotating the polarization of one branch (or set of branches) with respect to the other, may be part of/implemented by the combiner.

In general each optical input may have a respective optical splitter. However the optical polarization rotator and optical combiner may be implemented separately per WDM wavelength or for a set of or all the WDM wavelengths.

In the former case each of the optical inputs may have a respective optical polarization rotator and optical combiner. The transmitter may further comprise an optical wavelength multiplexer to multiplex the optical outputs from the optical combiners.

In the latter case the branches corresponding to the same polarization or bit significance (e.g. LSB, MSB) may first be combined by optical WDM multiplexing and then one (or both) of the combined wavelengths may be polarization rotated before the two (or more) sets of multiplexed, orthogonal polarization signals are combined to provide a modulated light output.

Thus the transmitter may comprise a first optical combiner to combine a first of the branches from each optical input and a second optical combiner to combine a second of the branches from each optical input. The first and second optical combiners may comprise respective first and second optical wavelength multiplexers. The shared optical polarization rotator may be coupled to an output of the first optical wavelength multiplexer. The transmitter may further comprise a third optical combiner to combine a polarization rotated output of the first optical wavelength multiplexer with an output of the second optical wavelength multiplexer to provide a combined wavelength division multiplexed output.

In some implementations the graphene electro-absorption modulator, and the graphene phase modulator, may comprise one or more graphene layers. These may be integrated with a waveguide, for example adjacent a core of the waveguide so that an evanescent wave of light propagating in the waveguide couples to the graphene. In some implementations the waveguide may comprise a longitudinal structure, for example having a rectangular cross-section, on a substrate and a graphene layer may be provided above and/or below this structure, or potentially in between a pair of such waveguide structures with either a wide spacing akin to a slot waveguide, or a narrow spacing e.g. just sufficient for the graphene so as to form effectively a unitary waveguide structure. The structure may be fabricated from, for example, silicon, silica, silicon nitride, or polymer; where the waveguide is conduction (e.g. Si) the graphene may be electrically insulated from the waveguide by a thin oxide layer. One or two (or more) graphene layers may be employed; the graphene may be single layer or multi-layer and optionally doped.

In some implementations the graphene electro-absorption modulator and the graphene phase modulator may be implemented by graphene provided at, e.g. covering or beneath, different longitudinal regions of the same waveguide. The graphene at these two (or more) regions may be provided with respective electrode connections to implement the graphene electro-absorption modulator and the graphene phase modulator.

In some implementations the graphene electro-absorption modulator, and the graphene phase modulator, may further comprise a drive electrical connection to one of the one or more graphene layers and a second or counter-electrode connection. The counter-electrode connection may comprise an electrical connection to the waveguide (e.g. for a silicon waveguide), and/or an electrical connection to a second of the one or more graphene layers and/or an electrical connection a further metal layer of the device. For example in one implementation a silicon waveguide (S), a 10 nm $SiO_2$ insulating layer (I), and a graphene layer (G) form a SIG capacitor with connections to S and G.

In some implementations the Wavelength Division Multiplexing (WDM) optical transmitter includes optical signal sources, such as DFB (distributed feedback) lasers, and the set of optical inputs may then comprise internal inputs, receiving the signals from the lasers.

In a related aspect there is provided a graphene-based modulator configured to provide pre-chirp for normal dispersion. Thus there is provided an optical modulator comprising a graphene electro-absorption modulator optically coupled in series with a graphene phase modulator, wherein the graphene electro-absorption modulator applies positive chirp to a modulated optical signal and the graphene phase modulator is configured to apply negative chirp to the modulated optical signal.

In a further related aspect there is provided a method of transmitting a Wavelength Division Multiplexing (WDM) signal along an optical fibre. The method may comprise inputting data for transmission. Optionally the method may also involve low pass filtering the data (which here may include band-pass filtering the data). The method may then modulate each wavelength (band) of the WDM optical signal with a portion of the low pass filtered data using a respective graphene electro-absorption modulator (EAM). The modulating may include biasing each graphene electro-absorption modulator into a region in which it adds a (positive) pre-chirp to the modulated wavelength to compensate for a (negative) chirp in the optical fibre.

The method may further comprise phase modulating one or more of the wavelengths using a graphene phase modulator to add further chirp to the wavelength. The further chirp may be positive, to extend the length of dispersion compensated fibre, or negative, to reduce excessive positive chirp from the EAM and/or to compensate for normal dispersion of the fibre at one or more of the wavelengths. The method may also adjust the drive of each EAM according to the wavelength it is modulating. Thus in general the method may involve providing a different pre-chirp, positive or negative and/or quantitatively different, for different wavelengths of the WDM signal, in particular to compensate for the different dispersion of the fibre at different wavelengths.

The method may further comprise splitting each wavelength of the WDM optical signal into two or more branches. The modulating may comprises modulating each branch using a respective graphene electro-absorption modulator, and combining the modulated light in each branch. The method may further comprise rotating the polarization of light of (in or from) one of the branches (for each wavelength) with respect to the other such that the combined modulated light from the branches comprises light of two orthogonal polarizations. The polarization rotation may be performed before or after combining the wavelengths of the WDM signal using one or more optical multiplexers.

In a further related aspect there is provided an optical transmission system comprising means for implementing the above described method.

In some implementations of the above-described devices and methods the optical fibre may comprise photonic crystal optical fibre. This can help to increase the operating wavelength range, in particular when operating in a spectral region in which absorption of the material constituting the fibre is large, e.g. for wavelengths greater than 1610 nm.

DRAWINGS

These and other aspects of the invention will now be further described by way of example only, with reference to the accompanying Figures, in which.

In the figures like elements are indicated by like reference numerals.

DESCRIPTION

Graphene can be used for realizing electro-absorption modulators. The paper "Chirp management in silicon-graphene electro absorption modulators," Opt. Express 25, Sorianello et al, 19371-19381 (2017) describes compensation for fibre dispersion at 1550 nm with a graphene based electro-absorption modulator. The dispersion compensation was of the order of 840 ps/nm, well beyond the requirement for 2 km and 10 km long links.

Figure 1:
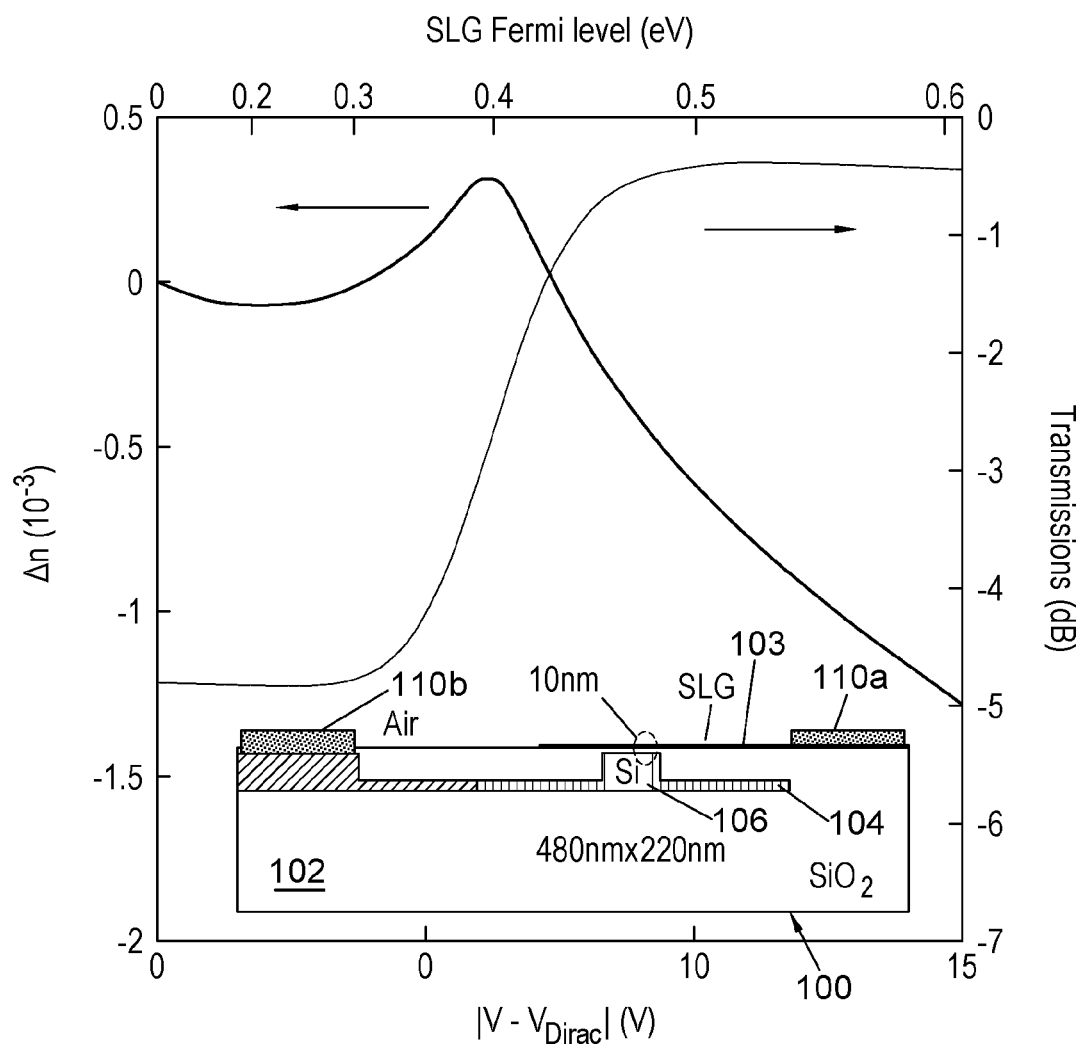
FIG. 1 shows a graphene EAM and transmission properties of the EAM according to the prior art.

FIG. 1, taken from this paper, shows the simulated effective refractive index change (left hand axis) and transmission (right hand axis) at 1550 nm or a single layer graphene (SLG) on silicon waveguide EAM with a 100 µm long SLG region (see the paper for fabrication details).

The inset diagram shows a vertical cross section through the EAM 100, which comprises a silicon-on-insulator substrate defining a region of silica 102 in which is formed a silicon waveguide 104. A thin oxide layer 106 is provided over the waveguide and a single layer of graphene 108 is provided over the oxide. Electrical connections 110a,b are made to the graphene and silicon. When viewed from above the graphene extends, in this example, for 100 µm longitudinally along the waveguide.

The same structure can be used to implement the phase modulators described later.

In use the graphene layer of the EAM is driven so that its Fermi level is greater than the Pauli blocking condition, that is greater than 0.4 eV (in this example), as illustrated by the shaded portion of FIG. 1. The horizontal, voltage axis of FIG. 1 is relative to the Dirac point voltage, in this example around −7V; thus the EAM may be biased, for example, at around −1V. (The Dirac point voltage depends on the doping: there is typically some intrinsic doping and there may be extrinsic doping and the effective doping can be varied by an applied bias; at the Dirac point the carrier density is close to zero and resistivity is at a maximum).

Figure 2A:
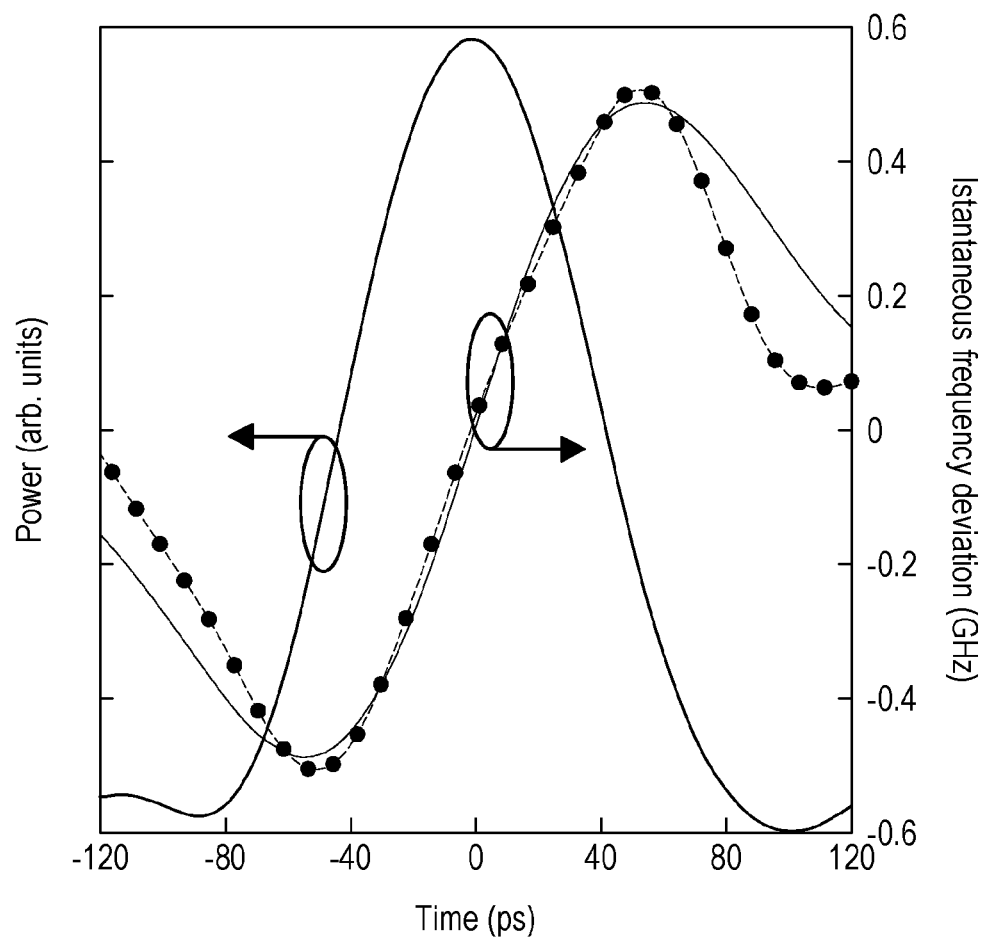
FIG. 2 illustrates chirp-related properties of the EAM of FIG. 1 according to the prior art.

As can be seen from FIG. 1, when operating in this region, when a voltage is applied to the graphene EAM the transmission increases while the effective index of the optical mode decreases. Therefore when a pulse is created the phase of the optical beam at the output of the modulator is smaller at the pulse peak than at the pulse tails. The instantaneous frequency deviation may be determined by differentiating the phase and FIG. 2a illustrates one example pulse, showing amplitude (power) on the left hand axis and instantaneous frequency deviation on the right hand axis (the continuous curve is experimental data, the points represent a simulation). It can be seen that there is a positive (upwards) frequency chirp during the pulse which is approximately linear.

The chirp can be defined by a chirp parameter C given by the following equation:

$$C = -\frac{2\pi L}{\lambda_0} \Delta n_{max}$$

where L is the device length (100 μm in this example). The change in refractive index, $\Delta n_{max}$, is the maximum variation of the effective index obtained when driving the modulator to minimum absorption; it can be determined, for example, from FIG. 1 or by fitting a curve to a theoretical version of FIG. 2a (as described in Sorianello et al, ibid), and $\lambda_0$ is the centre wavelength. In this example the EAM is driven with a peak-to-peak voltage of 2.7V the chirp parameter, C=0.27.

FIG. 2b illustrates another pulse, showing amplitude (left hand axis) and phase (right hand axis) on the left hand graph; and amplitude (power) and chirp (instantaneous frequency shift) on the right hand graph. It can be seen that the phase temporal profile has the same shape and duration as the amplitude envelope, but with inverted sign.

FIG. 2c illustrates a measure of chirp on the left hand axis (units: change in frequency in GHz) against peak to peak applied voltage for the EAM. Referring back to FIG. 1 it can be seen that above around 0.45 eV the transmission of the graphene remains approximately constant whereas the phase decreases roughly linearly. Thus by changing the peak-to-peak voltage the degree of phase change, and hence chirp, can be varied.

Figure 3:
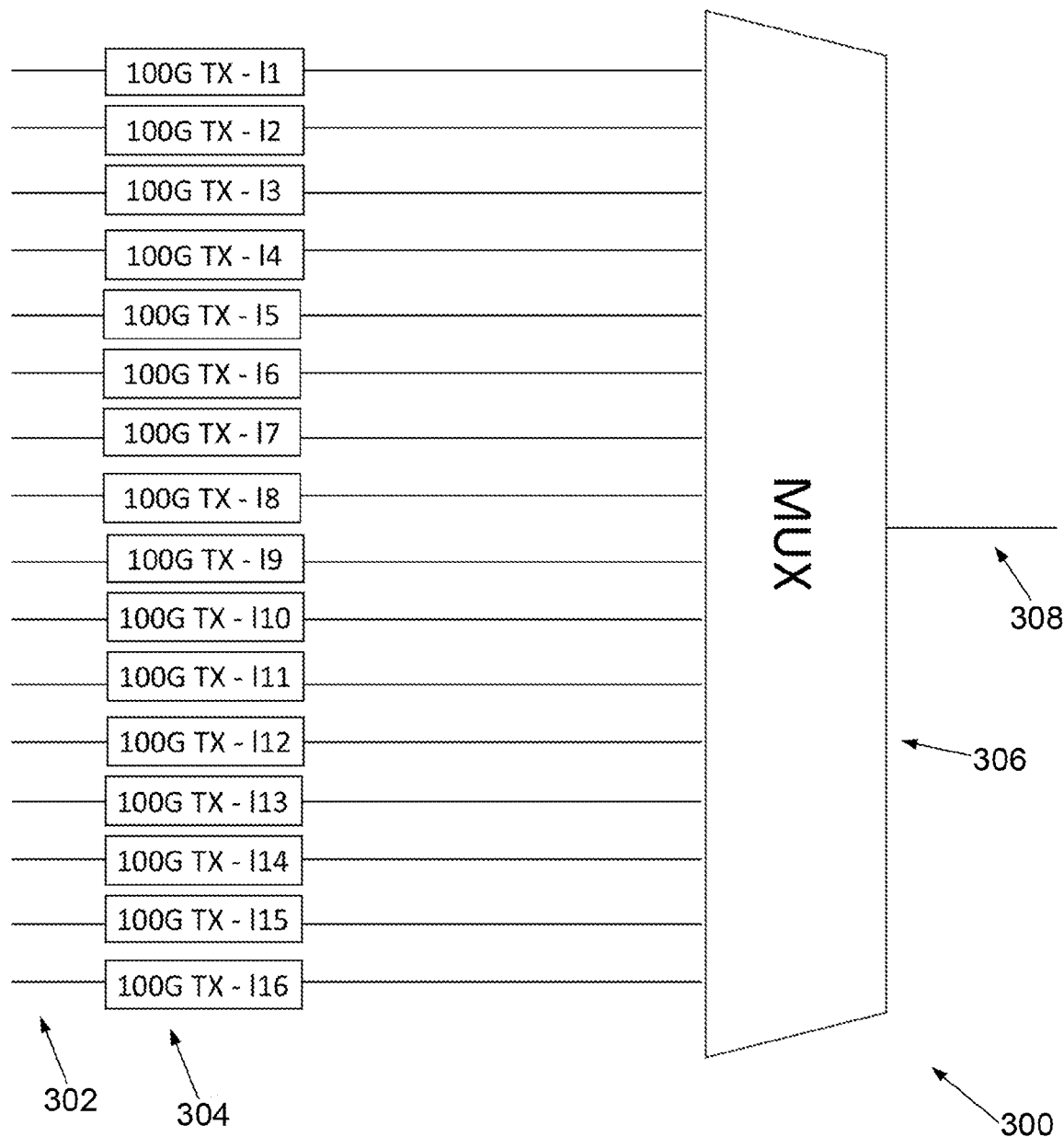
FIG. 3 shows an example CWDM optical transmitter.

Referring to FIG. 3, this shows an example of a CWDM16 optical transmitter 300 comprising a set of optical inputs 302, one for each wavelength; a graphene EAM 304 for each optical input; a multiplexer to combine the modulator light from the EAMs; and an optical output 308, which may be suitable for coupling to an optical fibre such as a single mode optical fibre. The multiplexer 306 may be implemented using integrated optics or free space micro-optics.

Substantially the same graphene EAM design may be used for each of the EAMs, thus facilitating manufacture. This is because a graphene EAM is able to operate over a wide range of wavelengths. The voltage tuneable chirp is similarly able to compensate for the optical fibre chromatic dispersion over a wide range of wavelengths. For example, for CWDM8 the fibre dispersion ranges from −5 ps/(nm km) to +7 ps/(nm km) and in CWDM16 the maximum dispersion at 1610 nm is around +20 ps/(nm km). The design of FIG. 3 is able to accommodate wavelengths up to and well beyond 1610 nm, for example to greater than 2000 nm or 2100 nm. The zero dispersion wavelength of a standard single mode fibre is around 1310 nm; the dispersion penalty increases with increasing distance from this wavelength.

For reference, two example sets of centre wavelengths for CWDM16 are given in Table 1 and Table 2 below:

TABLE 1

| Lane | Centre Wavelength |
|------|-------------------|
| L1   | 1271 nm *         |
| L2   | 1291 nm *         |
| L3   | 1311 nm           |
| L4   | 1331 nm           |
| L5   | 1351 nm           |
| L6   | 1371 nm           |
| L7   | 1391 nm           |
| L8   | 1411 nm           |
| L9   | 1431 nm           |
| L10  | 1451 nm           |
| L11  | 1471 nm           |
| L12  | 1491 nm           |
| L13  | 1511 nm           |
| L14  | 1531 nm           |
| L15  | 1551 nm           |
| L16  | 1571 nm           |

TABLE 2

| Lane | Centre Wavelength |
|------|-------------------|
| L1   | 1311 nm           |
| L2   | 1331 nm           |
| L3   | 1351 nm           |
| L4   | 1371 nm           |
| L5   | 1391 nm           |
| L6   | 1411 nm           |
| L7   | 1431 nm           |
| L8   | 1451 nm           |
| L9   | 1471 nm           |
| L10  | 1491 nm           |
| L11  | 1511 nm           |
| L12  | 1531 nm           |
| L13  | 1551 nm           |
| L14  | 1571 nm           |
| L15  | 1591 nm           |
| L16  | 1611 nm           |

The asterisks in Table 1 indicate the wavelengths at which there is normal rather than anomalous dispersion.

Figure 4:
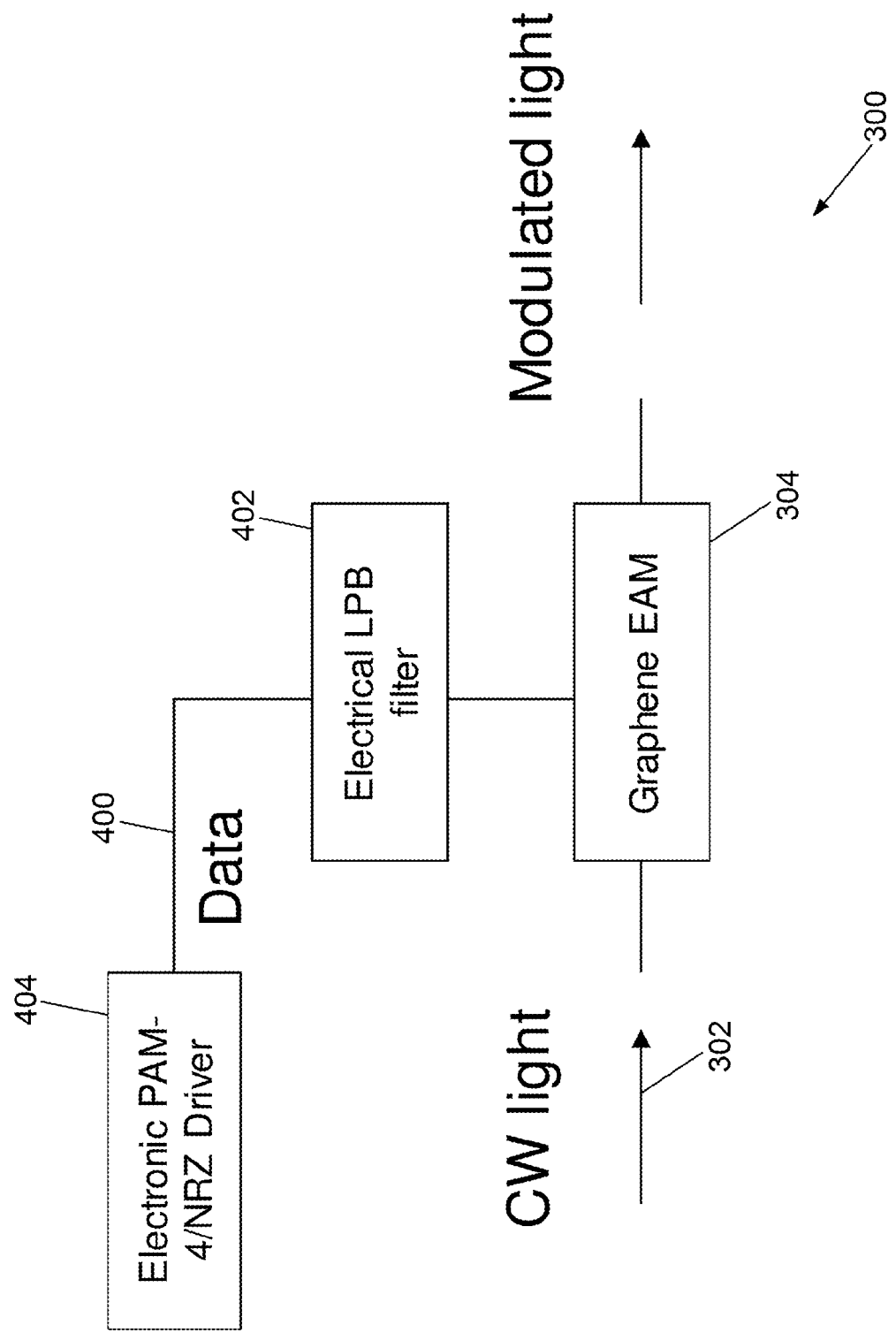
FIG. 4 shows details of a light modulation system in the transmitter of FIG. 3.

FIG. 4 illustrates details of light modulation of the system of FIG. 3. Thus a graphene EAM 304 is driven by a data input 400, via an electrical low pass filter 402 (LPB=low pass band). The data 400 is provided by a modulator 404 which provides, for example, PAM4 or NRZ data. The low pass filter 402 reduces inter-symbol interference (ISI). Not shown in FIG. 4 is a DC bias voltage generator to provide a bias voltage for EAM 304. The bias voltage may, for example, be applied via a bias tee between low pass filter 402 and EAM 304 (not shown).

The low pass filter 402 may have a cut-off frequency in the range 0.4 to 0.8 times the baud rate of the transmission. The length of the graphene EAM and the amplitude (or peak-to-peak voltage) of the driving signal may be adjusted according to the length of optical fibre to be compensated. The design target is that the sum of the positive chirp added by the graphene EAM and the negative chirp added by the fibre at the design length of fibre should be zero at the wavelength of the modulator light.

A system as described above may be used, for example, for a 2 km or 10 km optical fibre length with either CWDM8 or CWDM16; either NRZ or PAM4 modulation may be employed. For example, a CWDM16 transmitter may operate each optical channel (wavelength) at 100 Gb/s and may thus provide a total raw data rate of 1.6 Tb/s.

Figure 5:
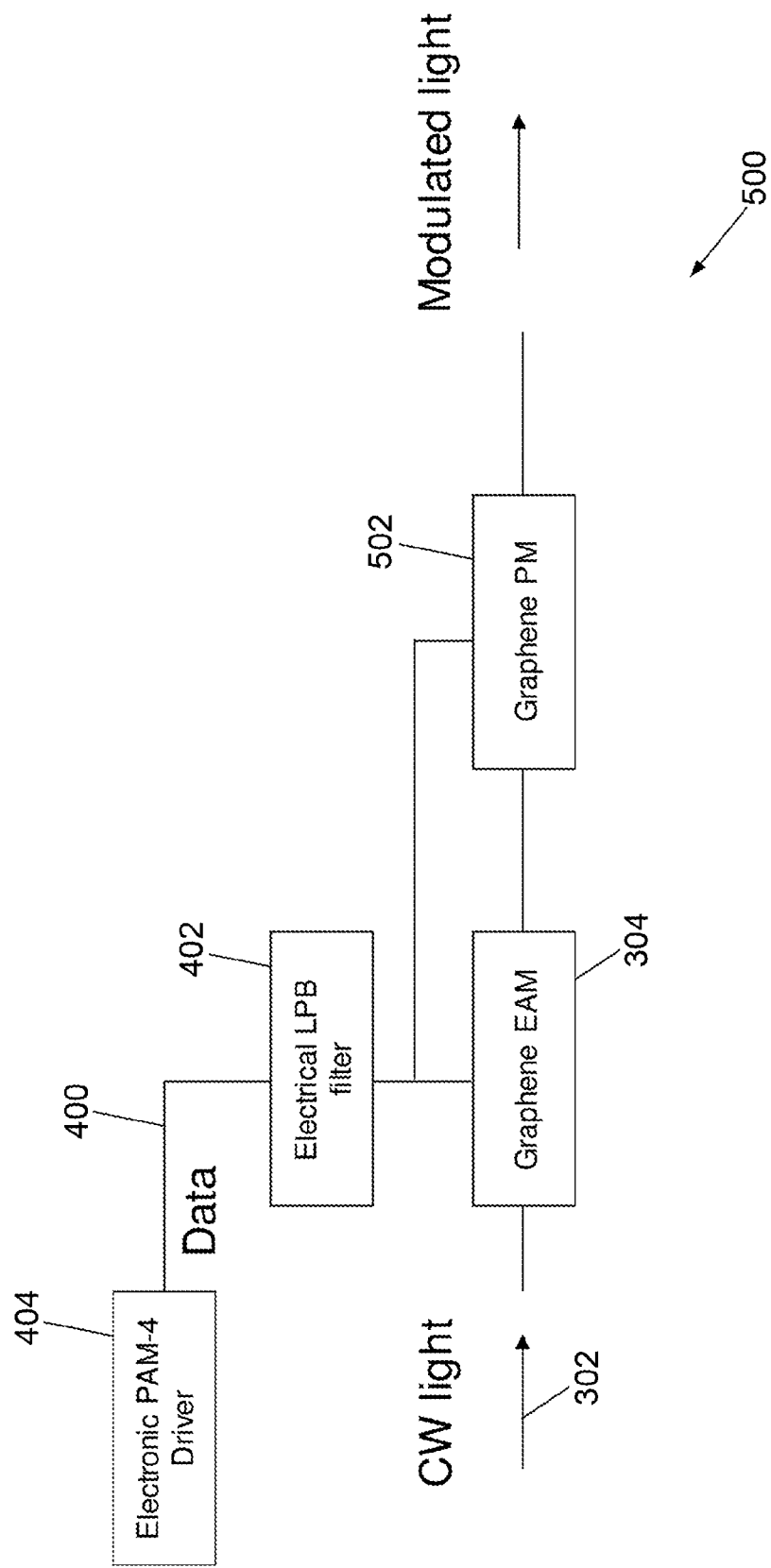
FIG. 5 shows a version of the light modulation system of FIG. 4 for longer fibre lengths.

FIG. 5 shows a light modulation system 500 which is a variant of the system of FIG. 4 able to compensate increased lengths of fibre. Like elements to those previously described are indicated by like reference numerals.

In the arrangement of FIG. 5 a graphene phase modulator 502 is coupled in series with the graphene EAM 304, either before or after the EAM, to provide additional positive chirp. The phase modulator is driven by the same low pass filtered data signal as in FIG. 4 but is biased differently. More specifically, the phase modulator is biased into the right hand portion of FIG. 1, beyond the shaded region. This is where the transmission through the graphene-integrated waveguide varies little but where the effective refractive index (i.e. phase) still varies significantly, for example as illustrated approximately linearly. The biasing arrangement is not shown in FIG. 5 but can be achieved by setting an appropriate bias voltage as shown by FIG. 1. For example a large negative bias voltage, i.e. a bias voltage that is more negative than the bias voltage used for the graphene EAM, may be employed.

For example, in some implementations the graphene EAM, as previously described, may be biased at −1V and the data modulation may be added to this so that the voltage on the EAM varies between −1V and some positive voltage which is dependent upon the desired degree of positive chirp. By contrast the graphene phase modulator may be biased at a bias voltage of much less than −1V so that when the data signal is added to the bias the voltage on the graphene phase modulator remains less than −1V and the graphene remains in its transparent region. Although as illustrated in FIG. 5 the same signal is provided to both the EAM and phase modulator the signals provided for these devices may have different peak-to-peak amplitudes (as well as the different bias voltages applied to the devices).

The arrangement of FIG. 5 adds further positive chirp to the modulated light without substantially affecting the amplitude modulation, and is therefore able to compensate for anomalous dispersion of the optical fibre over greater lengths, i.e. it is able to compensate for a greater degree of negative chirp added by the fibre.

Figure 6:
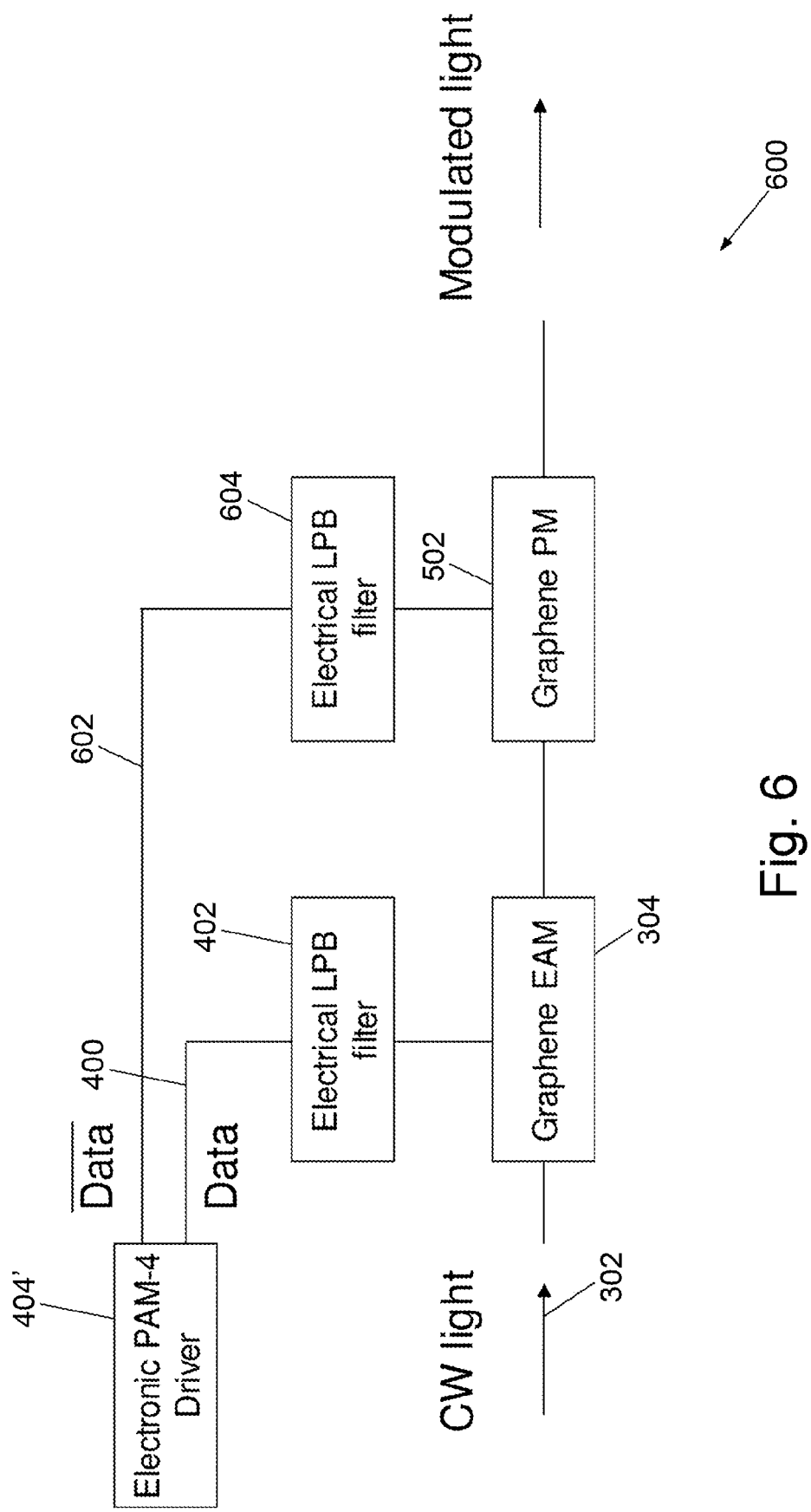
FIG. 6 shows a version of a light modulation system of FIG. 4 for compensating for both anomalous and normal dispersion.

FIG. 6 shows a version of a light modulation system 600 suitable for compensating for both anomalous and normal dispersion. Again, like elements to those previously described are indicated by like reference numerals. Thus, as in the arrangement of FIG. 5, a graphene phase modulator 502 is optically coupled in series with the graphene EAM 402 and biased as previously described.

However in FIG. 6 the phase modulator 502 is driven by an inverted version of the data 602, via a second low pass filter 604. Referring back to FIG. 1, the slope of the refractive index change (phase) with data voltage is therefore effectively inverted as compared with the graphene EAM. Thus the graphene phase modulator 502 adds negative chirp to the signal. This negative chirp may be used to compensate for excess positive chirp introduced by the graphene EAM and/or normal dispersion in the optical fibre. Again the design target is that the total chirp, that is the positive chirp from the EAM, the negative chirp from the phase modulator, and the positive or negative chirp from the optical fibre should be zero at the design length of the fibre.

Figure 7:
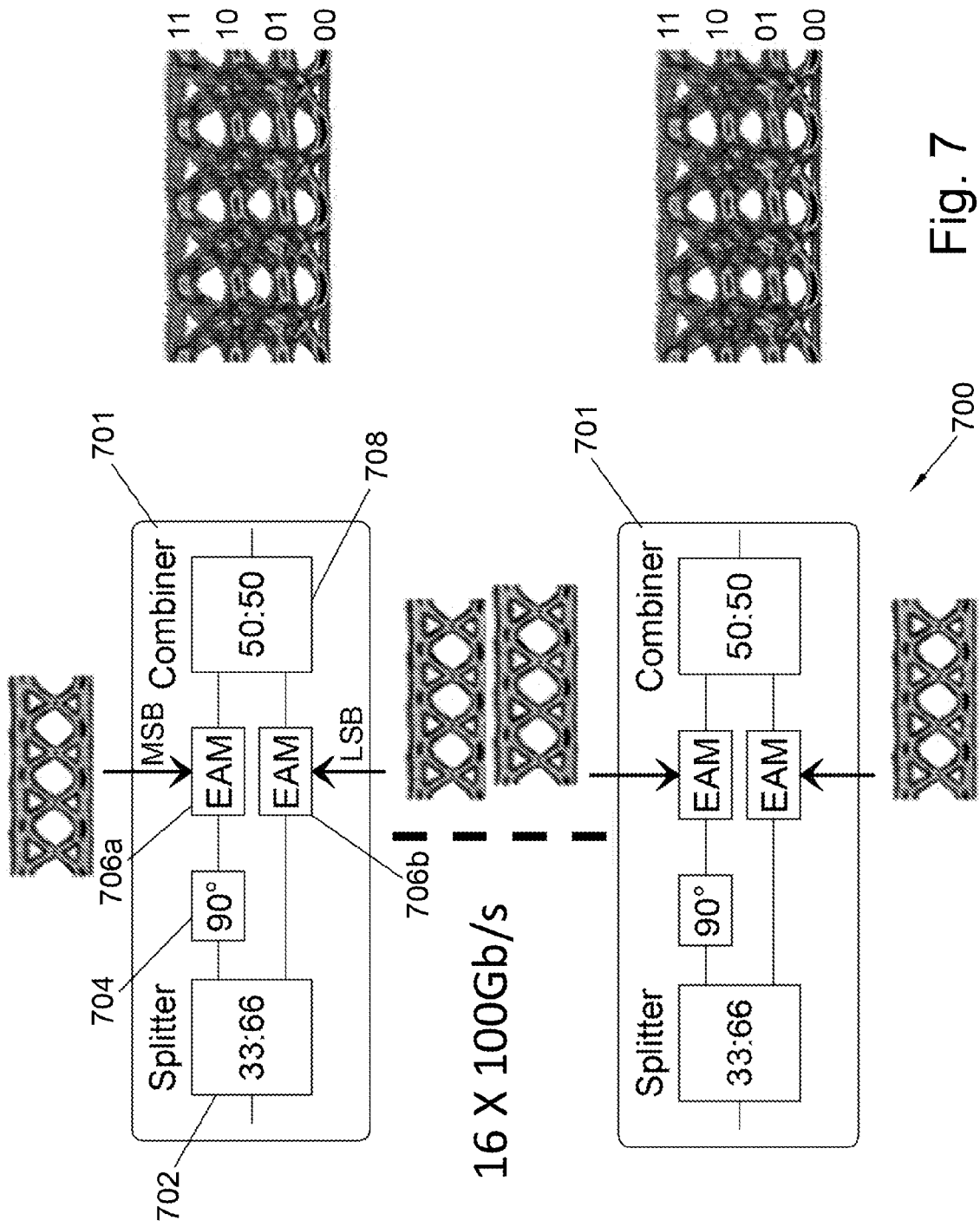
FIG. 7 shows a PAM4 light modulation system.

FIG. 7 shows a set of PAM4 modulators 701, in the example 16 modulators for a CWDM16 transmitter, each comprising a pair of graphene EAM devices as previously described. These may be used in the general arrangement of FIG. 3, one per wavelength (band).

In more detail each light modulation system comprises an optical power splitter 702 to split the optical signal into two branches, e.g. in the ratio x:(1-x) in implementations 1:2 (for PAM4). Each branch includes a respective graphene EAM 706a,b and the modulated light from the two branches is combined in an optical power combiner 708 e.g. in an equal ratio for PAM4 (where the MSB branch carries twice the signal level of the MSB branch). In an improved implementation one of the branches includes a 90 degree polarization rotation device 704 (such as an optical delay or waveplate); this may be part of the combiner 708. The combined data rate is twice the data rate of each separate EAM. The electrical signal may be grouped into pairs of bits and a least significant bit of the pair may modulate one of the EAMs and a most significant bit of the pair may modulate the other EAM.

In some implementations the polarization rotator and combiner is realized with an integrated polarization rotator and combiner having two input waveguides supporting at least orthogonal optical polarizations and one output waveguide supporting at least two orthogonal optical polarization modes. The polarization rotator and combiner takes the light at the two inputs on the same optical polarization and provides at the output a combination of the two on the same waveguide but each on a different orthogonal polarization.

For example in some implementations the functionality of polarization rotation and combiner may be obtained on the output optical fibre by means of a dual polarization grating coupler. The dual polarization grating coupler may have two input waveguides and an optical output from the chip directed at an angle with respect to the a normal to a plane of the chip (coupler). The output may comprise a grating formed on the waveguides. The light at the input waveguides may then be coupled out of the chip into two orthogonal polarizations.

Figure 8:
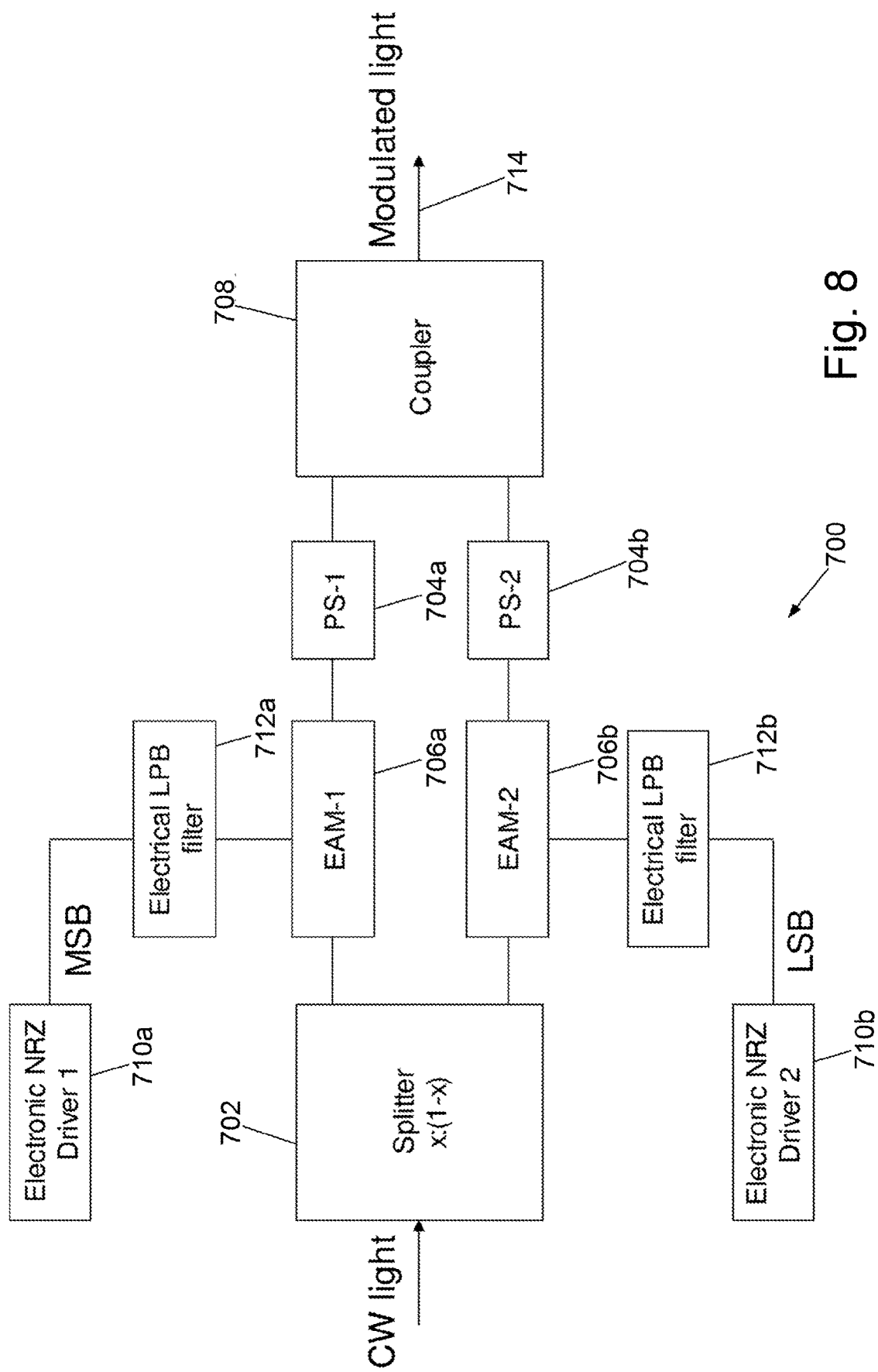
FIG. 8 shows a detailed example of the PAM4 light modulation system of FIG. 7.

FIG. 8 shows a more detailed example of the arrangement of FIG. 7, for generality illustrating a pair of polarization shifters 704a,b. FIG. 8 also illustrates the MSB and LSB drivers 710a,b (in practice these would generally be part of a combined driver), and respective low pass filters 712a,b, providing a modulated light output 714. Other aspects of the system are as previously described and, in particular, the graphene EAMs are designed with a chirp to compensate for that introduced by the fibre (according to the length of the fibre).

Figure 9:
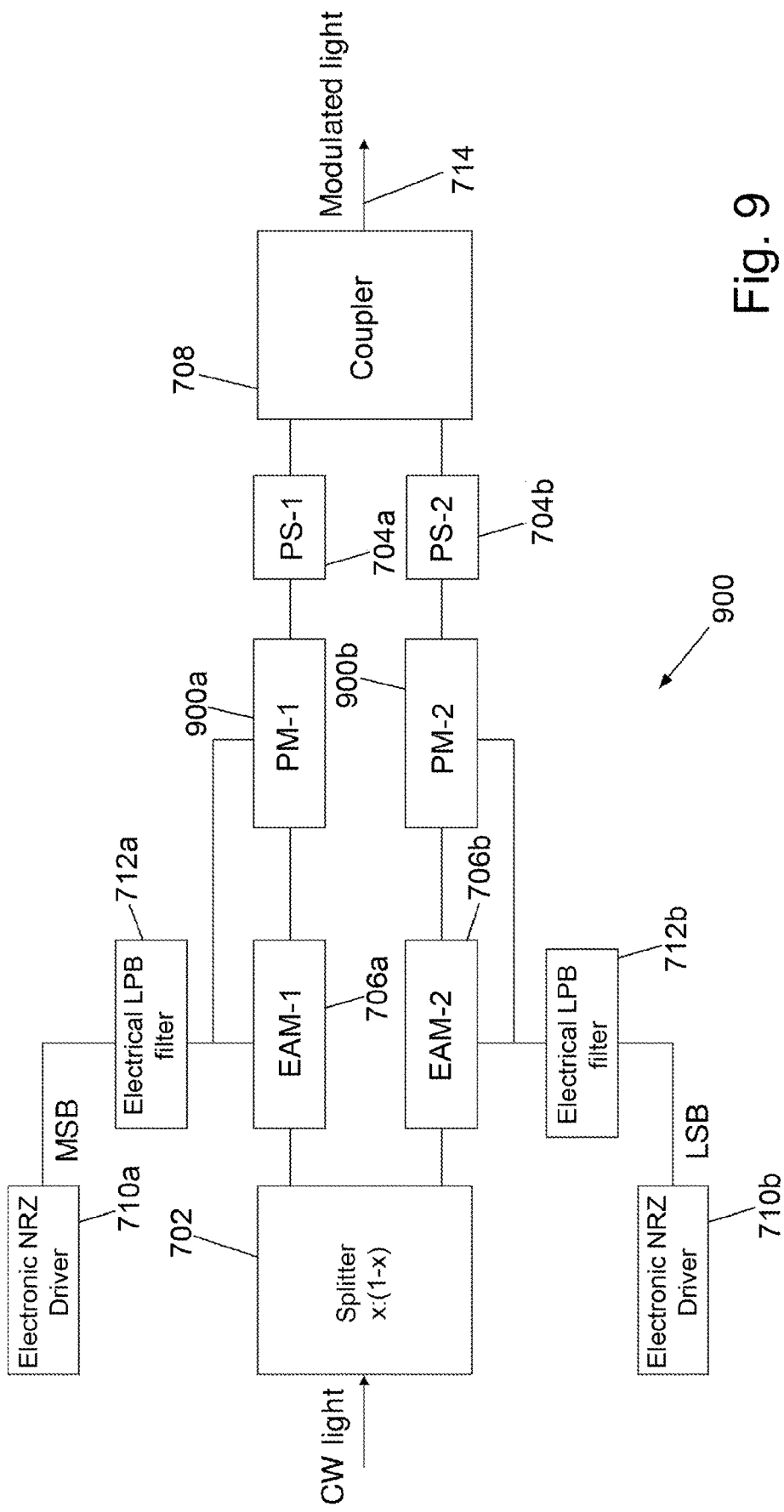
FIG. 9 shows a version example of the PAM4 light modulation system of FIG. 8 based on the light modulation system of FIG. 5.

FIG. 9 shows a version of the system of FIG. 8 incorporating a pair of phase shifters 900a,b as previously described with reference to FIG. 5, to provide additional positive chirp for a wavelength (band).

Figure 10:
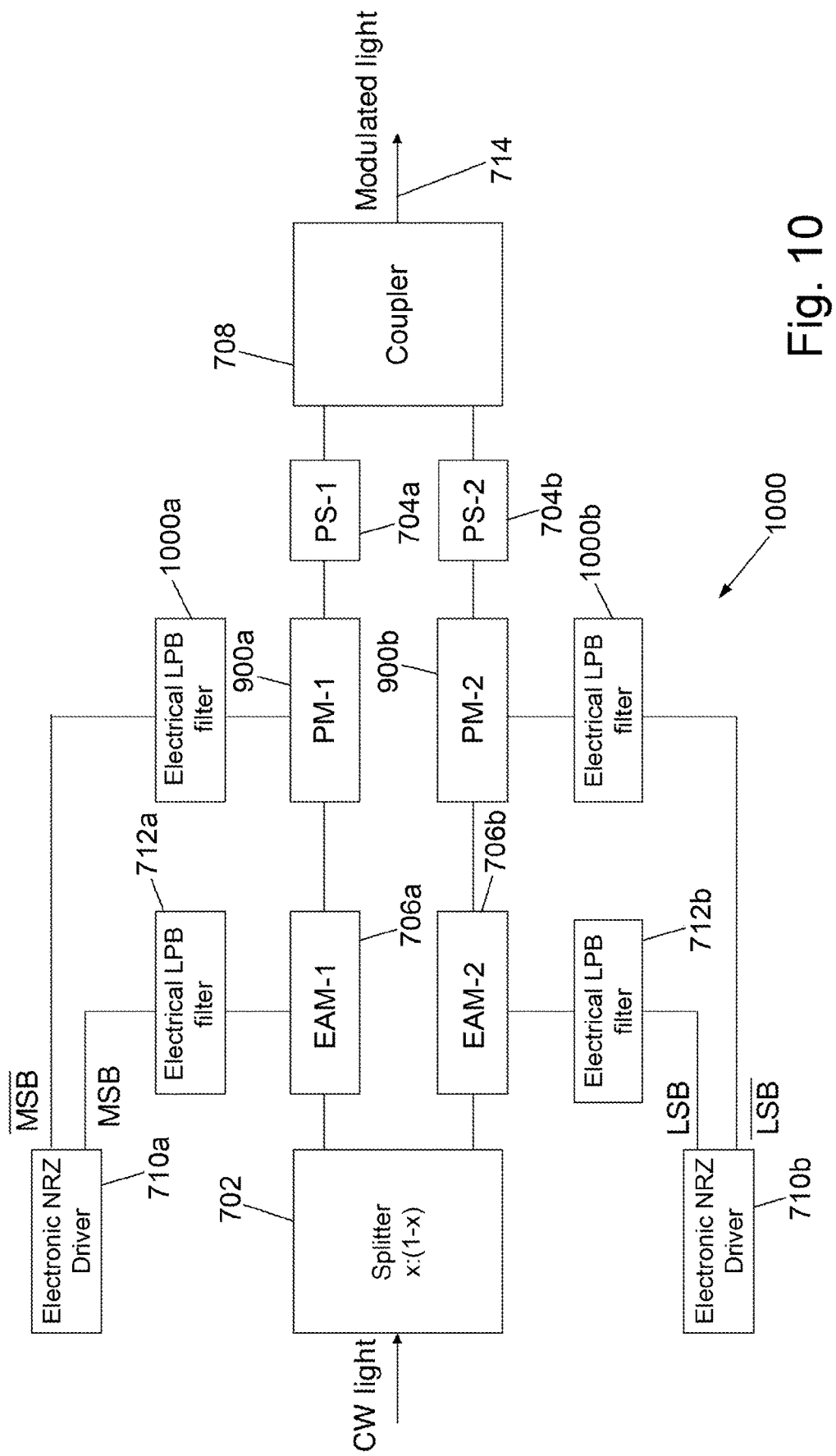
FIG. 10 shows a version example of the PAM4 light modulation system of FIG. 8 based on the light modulation system of FIG. 6.

FIG. 10 shows a version of the PAM4 light modulation system of FIG. 8 including a similar pair of graphene-based phase shifters driven from inverted MSB and LSB data via respective electrical low pass filters 1000a,b as previously described with reference to FIG. 6. This provides negative chirp to compensate for excess positive chirp from an EAM and/or normal dispersion at the relevant wavelength (band) for the optical fibre.

Referring to the optical systems of FIGS. 7-10, in some implementations the modulated light at each wavelength may be combined in a wavelength multiplexer. In other implementations the optical systems are modified so that the LSB and MSB branches are kept separate and separately multiplexed together in respective wavelength multiplexers before combining, optionally rotating the polarization of one branch with respect to the other.

Figure 11:
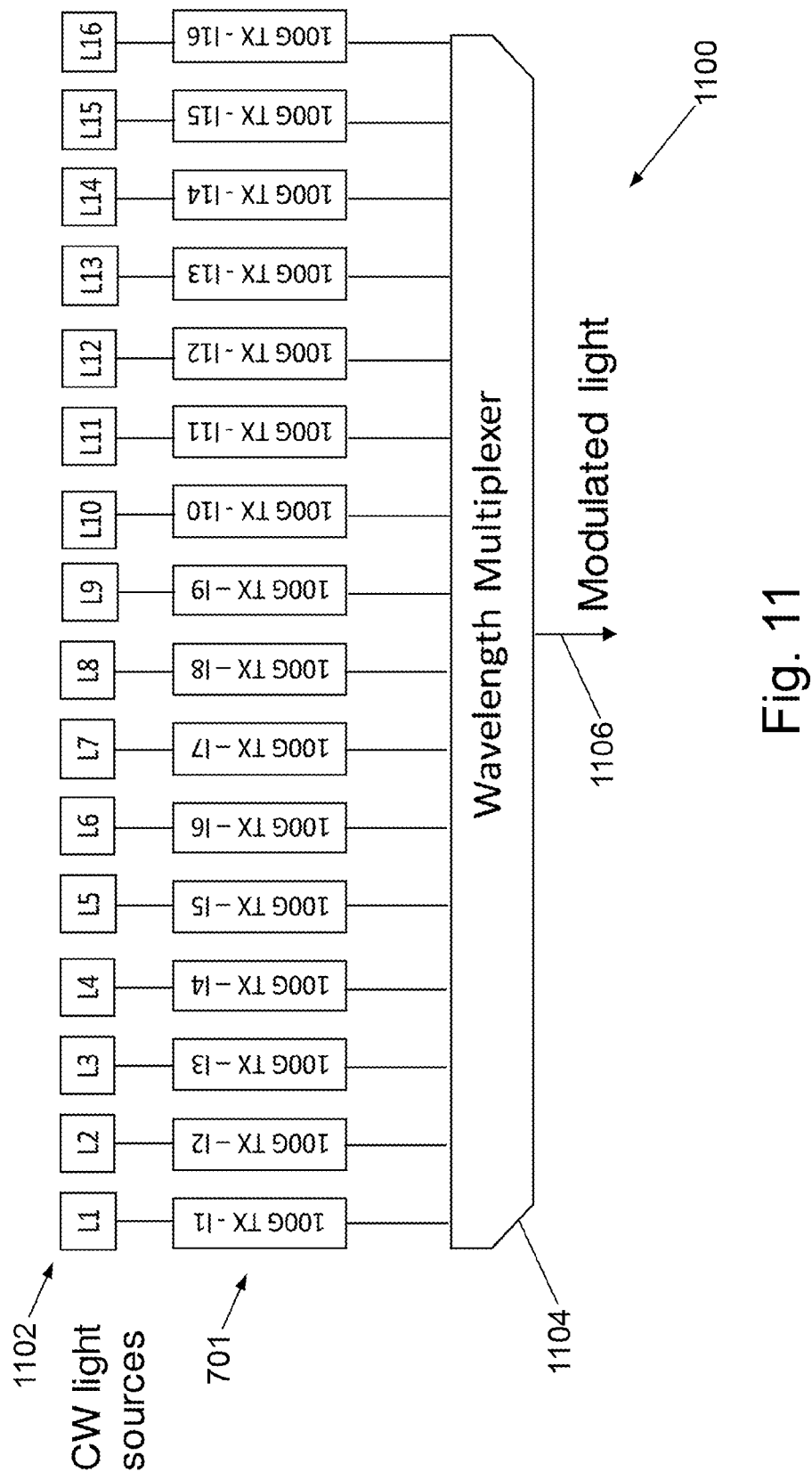
FIG. 11 shows an example of a CWDM optical transmitter for implementing the light modulating systems of FIGS. 7-10.

Thus referring to FIG. 11, this shows an example of a CWDM optical transmitter 1100 in which the MSB and LSB branches for each wavelength are combined prior to wavelength division multiplexing. Thus the CWDM optical transmitter 1100 comprises a set of continuous wave (CW) optical sources 1102 of different wavelengths, e.g. diode lasers, each coupled to a respective PAM4 modulator 701 comprising an optical power splitter, EAMs, and an optical power combiner, e.g. as shown in FIGS. 7-10. The light from each modulator 701 is provided to a wavelength multiplexer 1104 to provide a wavelength division multiplexed modulated light output 1106. In implementations the MSB and LSB polarizations are orthogonal and wavelength multiplexer 1104 supports the two orthogonal polarizations.

Figure 12:
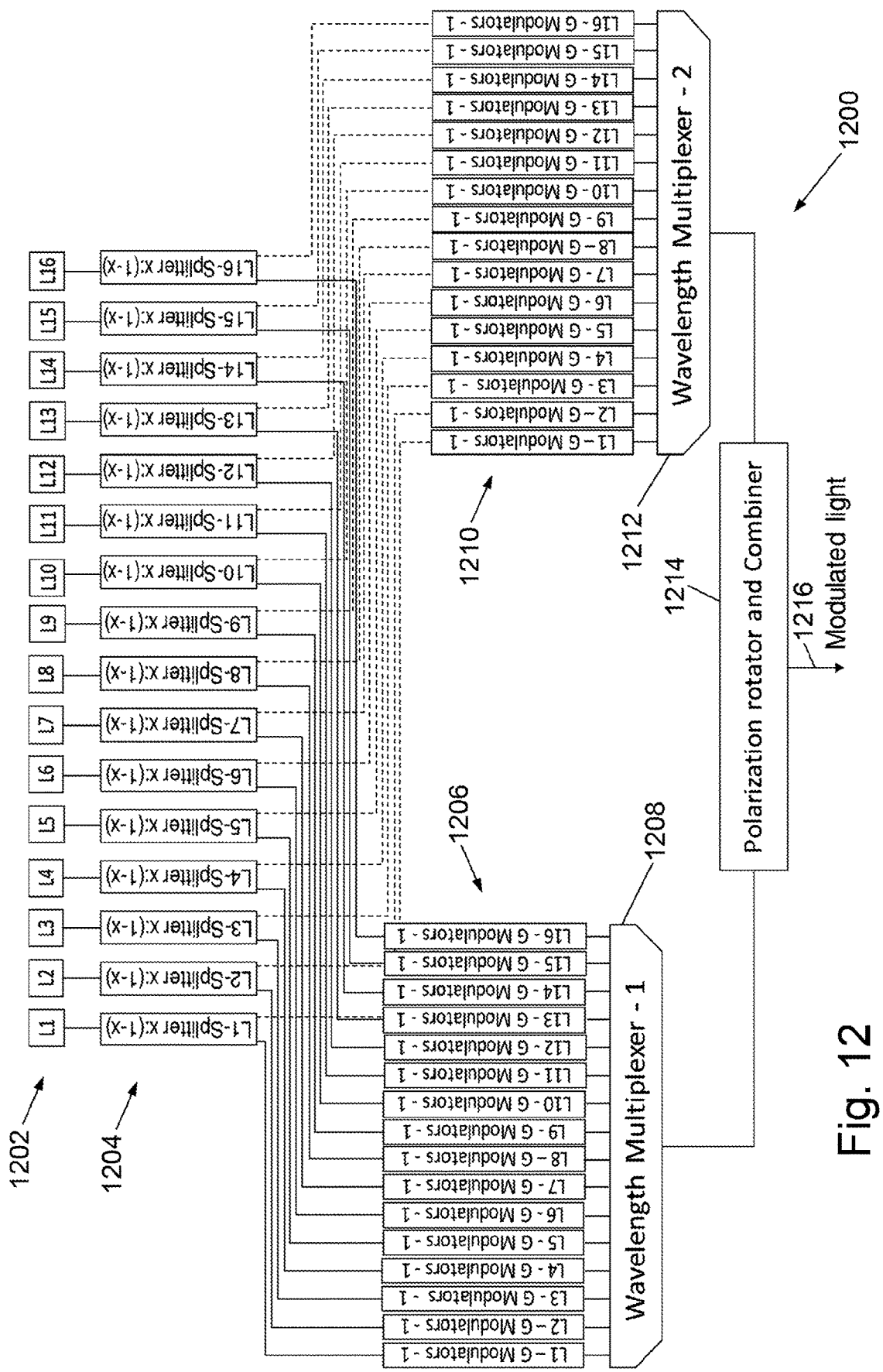
FIG. 12 shows a modification of the CWDM optical transmitter of FIG. 11.

FIG. 12 shows an example of a CWDM optical transmitter 1200 in which the MSB and LSB branches are separately multiplexed before rotating the polarization of one branch with respect to the other and combining. This can avoid the need for a wavelength multiplexer which supports orthogonal polarizations. The light modulation/compensation systems of any of FIGS. 7-10 can be used in the optical transmitter of FIG. 12, but modified to multiplex the wavelengths of each branch before combining.

The CWDM optical transmitter 1200 comprises a set of continuous wave (CW) optical sources 1202, e.g. diode lasers, each coupled to a respective optical power splitter 1204 which provides two outputs in an x:(1-x) ratio e.g. 2:1 (MSB:LSB). The MSB output from each power splitter (solid line) is provided to a graphene EAM device 1206 as previously described; similarly the LSB output from each power splitter (dashed line) is provided to a graphene EAM device 1210. The graphene EAM devices 1206, 1210, in combination with any compensation and electrical filtering as previously described, may respectively be referred to as an MSB driver and an LSB driver. The modulated MSB wavelengths are provided to a first wavelength multiplexer 1208 and the modulated LSB wavelengths are provided to a second wavelength multiplexer 1212. Each optical multiplexer combines the same polarization component of each wavelength—for example assuming two orthogonal polarizations for each wavelength, the transmitter has one multiplexer for each polarization mode. After wavelength multiplexing the modulated light output from each of the two multiplexers 1208, 1212 is provided to a polarization rotator and combiner 1214 as previously described (this may be two devices or a combined device) with a modulated light output 1216. Thus the polarization of one set of multiplexed wavelengths may be rotated with respect to the other so that, e.g. the modulated MSB and LSB wavelength components have orthogonal polarizations.

The light modulation systems of FIGS. 4 to 10 may be used with a CWDM8 or CWDM16 optical transmitter employing PAM4 modulation to double the data rate whilst allowing compensation for anomalous and/or normal dispersion as previously described. Thus the light modulation system of FIGS. 8-10 may be implemented for each wavelength (band) of the transmitter, or just on selected wavelengths.

In some implementations compensation for normal dispersion by addition of negative chirp is only employed for shorter wavelengths, for example wavelengths below 1310 nm, for example for the 1270 nm and 1290 nm wavelengths of CWDM16. Thus, for example, the light modulation system of FIGS. 6 and 10 may be implemented on only some of the wavelengths, for example the two wavelengths below 1310 nm.

In some implementations the graphene electro-absorption array comprises an array of, e.g. straight, waveguides. Each waveguide includes a length, for example of order 0.1 mm, e.g. range 0.05-0.150 mm, covered with graphene to be electrically modulated, or in some other way having graphene in the evanescent wave region of the waveguide. Each waveguide may be provided with a wavelength-specific bias voltage and a drive signal, where the drive signal may be equal in amplitude for all the modulators in the array. The array may for example be configured for sixteen CWDM wavelengths, or more wavelengths because graphene EAMs can operate beyond 1610. The total range of operation may be extended beyond 2100 nm.

Some of the electro-absorption modulators may operate wavelengths (e.g. 1270 nm and 1290 nm) corresponding to negative chromatic dispersion of the fibre. A combination of two waveguide lengths of the same waveguide covered with graphene and two driver voltages and bias on the two lengths of graphene may be provided. The first length serves to operate the electro absorption modulator whereas the second length is also an electro absorption modulator but operated near the transparency or in the transparency region of graphene to minimize the additional contribution of absorption modulation. The role of the second electro-absorption modulator may be to induce a negative chirp on the signal. In order to obtain a negative chirp the second modulator may be driven with a driver signal inverted respect to the driver of the first modulator.

It is generally desirable to increase the bandwidth of the described systems. One approach would be to increase the bandwidth of each transmitter but this is practically difficult and can result in reduced propagation distance. Another way would be to increase the number of different wavelengths, as described above, combining the wavelengths into a single fibre, but silica fibres are increasingly lossy beyond L-band (1560-1610 nm). Thus in some implementations the system employs a combination of graphene modulators and photonic crystal optical fibres to provide useful performance above 1600 nm, for example up to and beyond 2000 nm.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:
1. A Wavelength Division Multiplexing (WDM) optical transmitter for transmitting a WDM signal along an optical fibre, the WDM optical transmitter comprising:
    a set of optical inputs, one for each wavelength of a WDM optical signal to be transmitted;
    a graphene electro-absorption modulator (EAM) for each optical input to modulate light from the optical input; and
    one or more drivers to drive each graphene electro-absorption modulator,
        wherein the one or more drivers have a data input, a low pass filter to low-pass filter data from the data input to provide low pass filtered data, and an output to drive each graphene electro-absorption modulator with a combination of the low pass filtered data and a bias voltage configured to bias the graphene electro-absorption modulator into a region in which when the transmission of the graphene electro-absorption modulator changes in a first direction the effective refractive index for the modulated light changes in a second, opposite direction and vice-versa,
        to provide a chirp having a first sign to the modulated light to compensate for a chirp having a second, opposite sign due to transmission of the modulated light through the optical fibre; and wherein the one or more drivers are configured to drive the graphene electro-absorption modulators for different wavelengths with different drive voltages to provide a different positive pre-chirp to the modulated light at different wavelengths to match changes in dispersion in the optical fibre with wavelength.

2. A transmitter as claimed in claim 1 wherein when the transmission of the graphene electro-absorption modulator increases the effective refractive index for the modulated light decreases and vice-versa, and wherein the first sign is positive and the second sign is negative, to provide a positive chirp to the modulated light to compensate for a negative chirp due to transmission of the modulated light through the optical fibre.

3. A transmitter as claimed in claim 1 further comprising at least one graphene phase modulator optically coupled in series with the graphene electro- absorption modulator, wherein the one or more drivers are configured to drive the at least one graphene phase modulator with a combination of the low pass filtered data and a bias voltage configured to bias the graphene phase modulator into a region in which the graphene phase modulator remains substantially transparent whilst the low pass filtered data changes an effective refractive index of the graphene phase modulator for the modulated light.

4. A transmitter as claimed in claim 1 further comprising at least one graphene phase modulator optically coupled in series with the graphene electro-absorption modulator, wherein the one or more drivers are configured to drive the at least one graphene phase modulator with a combination of inverted low pass filtered data from the data input and a bias voltage configured to bias the graphene phase modulator into a region in which the graphene phase modulator remains transparent whilst the low pass filtered data changes an effective refractive index of the graphene phase modulator for the modulated light.

5. A transmitter as claimed in claim 4 comprising a graphene electro-absorption modulator (EAM) for each optical input to modulate light from the optical input and the graphene phase modulator optically coupled in series with the graphene electro- absorption modulator for only selected ones of the optical inputs.

6. A transmitter as claimed in claim 1 comprising, for each of the optical inputs, an optical splitter to split the optical input into two or more branches, a graphene electro-absorption modulator for each branch to modulate light in the branch, and an optical combiner to combine the modulated light from the branches.

7. A transmitter as claimed in claim 6 wherein the one or more drivers are configured to drive the graphene electro-absorption modulators in the branches with groups of two or more bits of data from the data input.

8. A transmitter as claimed in claim 6 further comprising an optical polarization rotator to rotate the polarization of light of one or more of the branches such that the combined modulated light from the branches comprises light of two orthogonal polarizations.

9. A transmitter as claimed in claim 8 wherein each of the optical inputs has a respective optical polarization rotator and optical combiner, the transmitter further comprising an optical wavelength multiplexer to multiplex the optical outputs from the optical combiners.

10. A transmitter as claimed in claim 8 wherein the optical inputs have a shared optical polarization rotator, the transmitter further comprising a first optical combiner to combine a first of the branches from each optical input and a second optical combiner to combine a second of the branches from each optical input, wherein the first and second optical combiners comprise respective first and second optical wavelength multiplexers; wherein the shared optical polarization rotator is coupled to an output of the first optical wavelength multiplexer; the transmitter further comprising a third optical combiner to combine a polarization rotated output of the first optical wavelength multiplexer with an output of the second optical wavelength multiplexer to provide a combined wavelength division multiplexed output.

11. A transmitter as claimed in claim 1 wherein one or both of the graphene electro-absorption modulator and graphene phase modulator comprise one or more graphene layers integrated with a waveguide, a drive electrical connection to one of the one or more graphene layers and counter-electrode connection.

12. A transmitter as claimed in claim 1 wherein the WDM optical signal is a CWDM8 or CWDM16 optical signal.

13. A transmitter as claimed in claim 1 wherein the optical fibre comprises photonic crystal optical fibre.

14. A method of transmitting a Wavelength Division Multiplexing (WDM) signal along an optical fibre, the method comprising:
    inputting data for transmission;
    low pass filtering the data;
    modulating each wavelength of the WDM optical signal with a portion of the low pass filtered data using a respective graphene electro-absorption modulator (EAM);
    wherein the modulating includes
        biasing each graphene electro-absorption modulator into a region in which it adds a pre-chirp to the modulated wavelength to compensate for chirp in the optical fibre; and
        providing a different pre-chirp for different wavelengths of the WDM signal.

15. A method as claimed in claim 14 further comprising phase modulating one or more of the wavelengths using a graphene electro-absorption modulator to add further chirp to the wavelength.

16. A method as claimed in claim 15 wherein the further chirp is negative chirp to compensate for the positive chirp of the graphene electro-absorption modulator.

17. A method as claimed in claim 14 further comprising splitting each wavelength of the WDM optical signal into two or more branches, wherein the modulating comprises modulating each branch using a respective graphene electro-absorption modulator, and combining the modulated light in each branch, the method further comprising rotating the polarization of light of one of the branches with respect to the other such that the combined modulated light from the branches comprises light of two orthogonal polarizations.

18. An optical transmission system comprising means for implementing the method of claim 14.

19. A method of transmitting a Wavelength Division Multiplexing (WDM) signal along an optical fibre, the method comprising:
    inputting data for transmission;
    low pass filtering the data;
    modulating each wavelength of the WDM optical signal with a portion of the low pass filtered data using a respective graphene electro-absorption modulator (EAM);

wherein the modulating includes
- biasing each graphene electro-absorption modulator into a region in which it adds a pre-chirp to the modulated wavelength to compensate for chirp in the optical fibre; and
- phase modulating one or more of the wavelengths using a graphene electro-absorption modulator to add further chirp to the wavelength.

20. A method as claimed in claim 19 wherein the further chirp is negative chirp to compensate for the positive chirp of the graphene electro-absorption modulator.

\* \* \* \* \*